US008925165B2

(12) United States Patent
Chen

(10) Patent No.: US 8,925,165 B2
(45) Date of Patent: Jan. 6, 2015

(54) OIL SEAL REMOVING TOOL

(76) Inventor: Jun Fan Chen, Taichung (TW)

( * ) Notice: Subject to any disclaimer, the term of this patent is extended or adjusted under 35 U.S.C. 154(b) by 745 days.

(21) Appl. No.: 13/279,299

(22) Filed: Oct. 23, 2011

(65) Prior Publication Data

US 2013/0097830 A1 Apr. 25, 2013

(51) Int. Cl.
*B23P 19/04* (2006.01)
*B25B 27/00* (2006.01)

(52) U.S. Cl.
CPC .................................. *B25B 27/0028* (2013.01)
USPC .................................. 29/235; 29/270; 29/278

(58) Field of Classification Search
USPC ........... 29/235, 270, 255, 278, 242, 243, 238, 29/237, 244
See application file for complete search history.

(56) References Cited

U.S. PATENT DOCUMENTS

| | | | | | |
|---|---|---|---|---|---|
| 307,544 | A * | 11/1884 | Hardwick | ........................ | 254/25 |
| 1,313,758 | A * | 8/1919 | Taylor | ............................. | 254/25 |
| 7,039,993 | B1 * | 5/2006 | Smith et al. | ..................... | 29/235 |
| 8,851,454 | B1 * | 10/2014 | Watts | ......................... | 254/131.5 |
| 2004/0069978 | A1 * | 4/2004 | Whelan | ........................... | 254/25 |

* cited by examiner

*Primary Examiner* — Lee D Wilson

(57) ABSTRACT

The present invention provides an oil seal removing tool including a pivotable hooking element and a location portion. The location portion has a slidable structure and an elastic element pressing against the slidable structure. The slidable structure is able to be engaged to the hooking element, and the elastic element pushes the slidable structure toward the hooking element. Moving the slidable structure can fix or release the engagement between the slidable structure and the hooking element. Thus, adjusting the working angle can be much easier and more efficient.

10 Claims, 6 Drawing Sheets

OIL SEAL REMOVING TOOL

BACKGROUND OF THE INVENTION

1. Field of the Invention

The present invention relates to an oil seal removing tool.

2. Description of the Prior Art

A conventional oil seal removing tool is disclosed in U.S.2001/0069978 as a tool having a hooking element with two hooking ends. The two hooking ends are designed to have different hooking angle in order to fit to different situations. However, the tool has only three working angle to adjust, so the range of usage is limited. Moreover, the hooking element has to be detached from the tool when adjusting the working angle of the hooking element. Thus, this kind of oil seal removing tool is not convenient.

To solve the problems mentioned above, an oil seal removing tool is disclosed in U.S. Pat. No. 7,039,993. The way to engage of the hooking element is different from the way mentioned above, so the hooking element doesn't have to be detached from the tool when adjusting the working angle of the hooking element. However, the working angle is fixed by two fixing elements, so the two fixing elements have to be detached when adjusting the working angle. In that, the problems mentioned above are not fully solved.

Thus, another structure is disclosed in U.S. Pat. No. 5,871,204. A hooking element having toothed portion is arranged on one end of a hand piece, and the hooking element can rotate relative to the hand piece. Also, the tool has a blocking portion with a toothed portion, and the toothed portion corresponds to the hooking element. The tool also has a screw element which is able to move reciprocally along the hand piece. When the screw element moves remote from the blocking portion, the engagement between the toothed portion and the hooking element is released. When rotating the hooking element to an appropriate angle and moving the screw element toward the blocking portion, the blocking portion is pushed and engaged to the hooking element. However, it is time-consumed and laborious that this kind of tool tightens the engagement by fastening the screw element by hand. The engagement is not able to be fixed tightly because of the limitation of the fastening force. In that, the tool might disintegrate when using. And the range of the working angle of the hooking element is narrow due to the limitation of structure.

The present invention, therefore, makes improvements on the disadvantages as mentioned above.

SUMMARY OF THE INVENTION

The main object of the present invention is to provide an oil seal removing tool which is easy to change the working angle of a hooking element.

To achieve the above and other objects, an oil seal removing tool of the present invention includes a hand piece, a hooking element and a location portion.

The hand piece has an engaging end and a holding end. A sliding slot is formed at the engaging end. Two corresponding boards extend from the engaging end, and the each board has an aperture. Also, a groove is formed between the two boards, and the hooking element is disposed in the groove. The hand piece also includes a blocker which is disposed in the groove.

The hooking element includes two hooking portions and a location end. An arc-shaped toothed portion is formed at the location end. More preferably, the two hooking portions have different hooking angles. Moreover, the hooking element has a pivot hole corresponding to each aperture. An engaging element is arranged in the pivot hole and the apertures. In that, the hooking element is arranged to the engaging end pivotably.

The location portion is slidably disposed at the engaging end and includes a sliding sleeve, a toothed element and an elastic element, wherein the elastic element locates between the toothed element and the blocker. The position of the sliding sleeve corresponds to the sliding slot, and the sliding sleeve slides reciprocally between a first position and a second position. When the sliding sleeve is at the first position, the toothed element is engaged with the toothed portion of the hooking element due to an elastic force by the elastic element. When the sliding sleeve is at the second position, the location portion is separated from the toothed portion and is pressed against the blocker. The elastic element enables the sliding sleeve to be pressed against the location end of the hooking element continuously. A longitudinal slot is formed on the sliding sleeve. A fixing hole is formed on the toothed element. Also, the fixing element is arranged in the longitudinal slot and the fixing hole, so the toothed element is able to slide between the first position and the second position along with the sliding sleeve. Thereby, one can change the working angle of the hooking element easily by pushing the sliding sleeve and separating the engagement between the toothed element and the location end.

Moreover, the groove between the two boards enables the hooking element to pivot in the groove at a maximum angle without hindrance.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
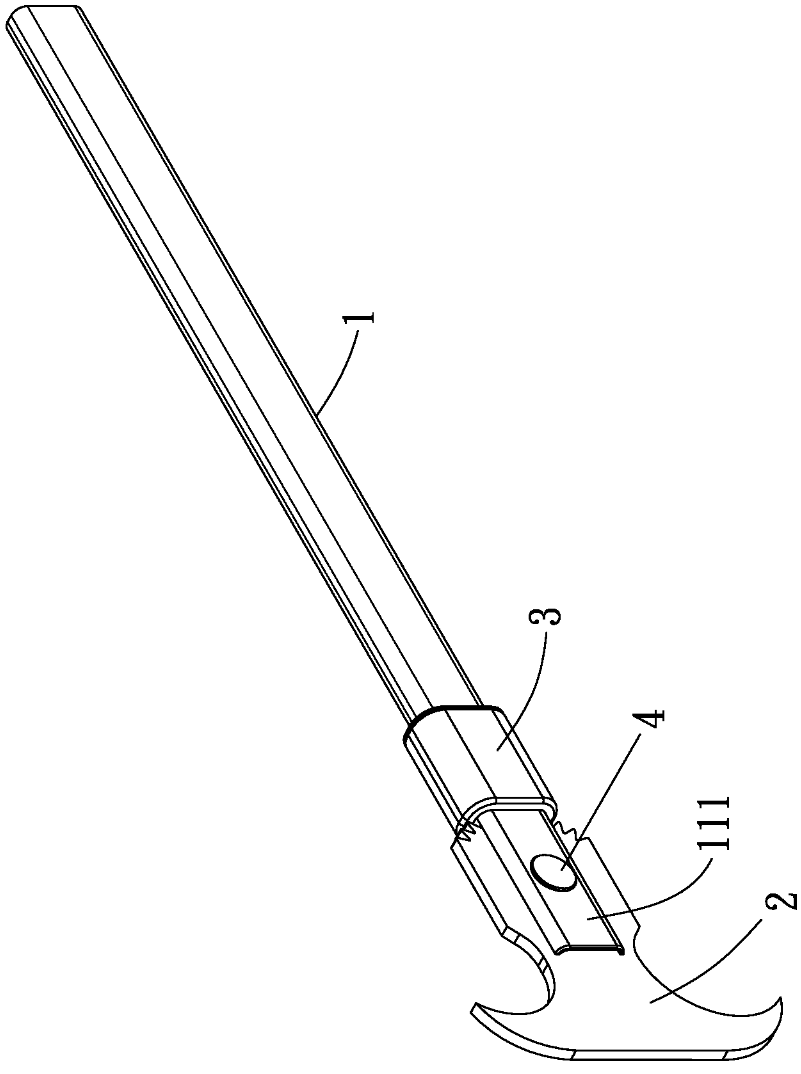
FIG. 1 is a stereogram showing a preferred embodiment of an oil seal removing tool of the present invention.
Figure 3B:
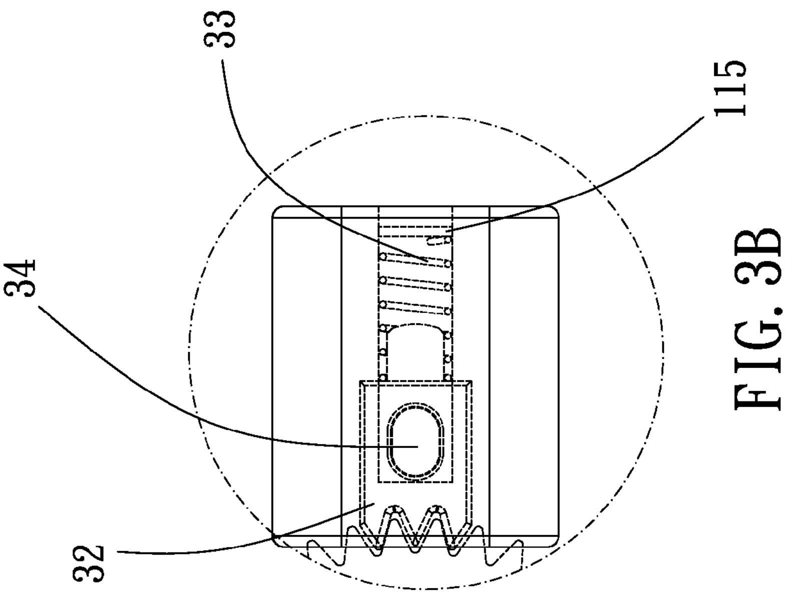
FIG. 3B is a perspective view showing a sliding sleeve of a preferred embodiment of the oil seal removing tool of the present invention.
Figure 3:
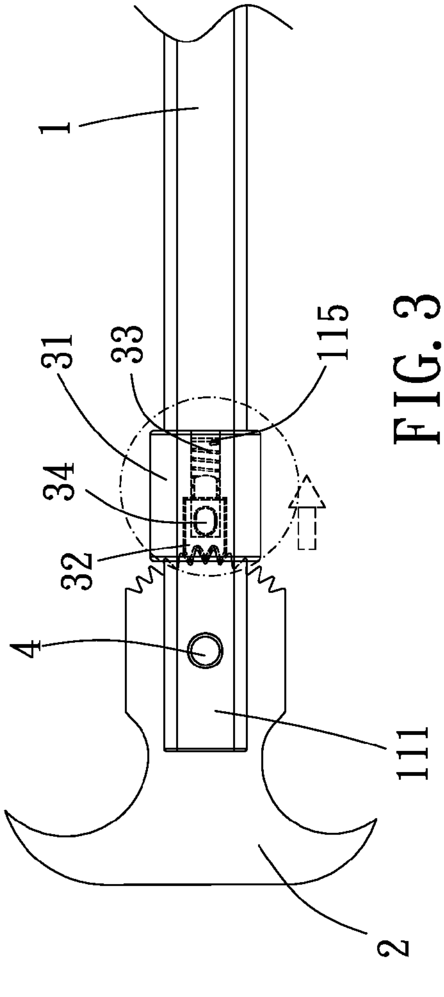
FIG. 3 and FIG. 3A are perspective views showing an action of a sliding sleeve of a preferred embodiment of the oil seal removing tool of the present invention.
Figure 3A:
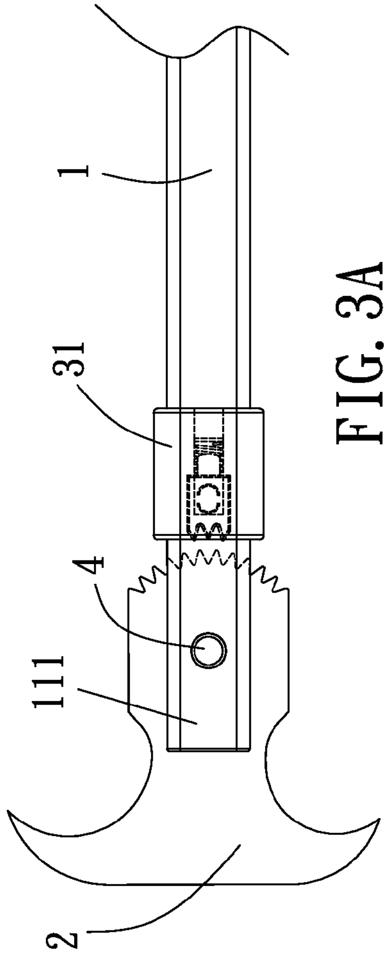

Please refer to FIG. 1 and FIG. 3, an oil seal removing tool of the present invention includes a hand piece 1, a hooking element 2, and a location portion 3.

Figures 2, 2A:
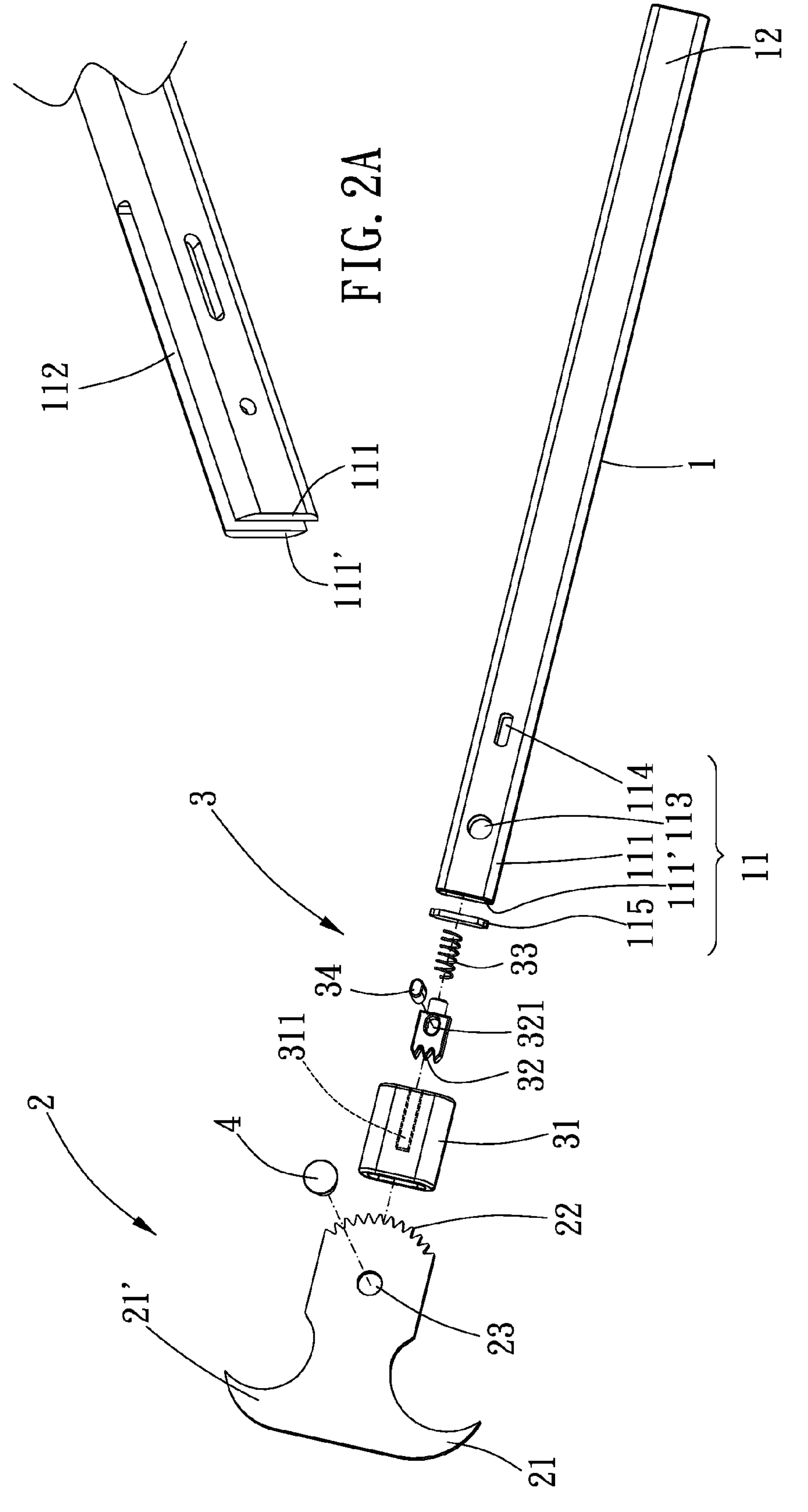
FIG. 2 is a breakdown drawing showing a preferred embodiment of an oil seal removing tool of the present invention.
FIG. 2A is a partial enlargement view of FIG. 2.

Please refer to FIG. 2 and FIG. 2A, in a principal embodiment, the hand piece 1 has an engaging end 11 and a holding end 12. A sliding slot 114 is formed at the engaging end 11.

Two corresponding boards 111,111' extend from the engaging end 11, and each board 111,111' has an aperture 113. A groove 112 is formed between the two boards 111,111'. The hooking element 2 is pivotably disposed on the groove 112, so that the hooking element 2 is able to pivot at a maximum angle. The hand piece 1 also has a blocker 115 which is arranged on the bottom of the groove 112. The hooking element 2 has two hooking portions 21,21', a location end 22 and a pivot hole 23. An arc-shaped toothed portion is formed on the location end 22. More preferably, the two hooking portions 21,21' have different hooking angles. The pivot hole 23 corresponds to the apertures 113. The oil seal removing tool of the present invention also includes an engaging element 4 which is arranged in the pivot hole 23 and the apertures 113. In that, the engaging element 4 is arranged to the engaging end 11 pivotably. In other possible embodiment of the oil seal removing tool of the present invention, the engaging element 4 might be a rivet, a pin, or a screw. Also, the engaging element 4 can be formed on the hooking element 2 or the engaging end 11.

Please refer to FIG. 2, FIG. 3, FIG. 3A, FIG. 3B and FIG. 4. The location portion 3 is slidably disposed on the engaging end and includes a sliding sleeve 31, a toothed element 32, an elastic element 33 and a fixing element 34. The position of the sliding sleeve 31 corresponds to the sliding slot 114. The sliding sleeve 31 is able to slide between a first position and a second position reciprocally. A longitudinal slot 311 is formed on the sliding sleeve 31, and the longitudinal slot 311 can be replaced with a hole in other embodiment of the present invention. A fixing hole 321 is formed on the toothed element 32. The fixing element 34 is engaged with the longitudinal slot 311 and the fixing hole 321, so that the toothed element 32 is able to slide with the sliding sleeve 31 reciprocally between the first position and the second position. When the sliding sleeve 31 is at the first position, one end of the toothed element 32 is engaged to the toothed portion of the hooking element 2 due to the elastic force by the elastic element 33. When the sliding sleeve 31 is at the second position, the engagement between the hooking element 2 and the toothed element 32 is separated, and the elastic element 33 is compressed. In other possible embodiment of the present invention, the toothed element 32 can be formed on the sliding sleeve 31 directly, or the fixing element 34 can be formed on the toothed element 32 or the sliding sleeve 31 directly.

Figure 4:
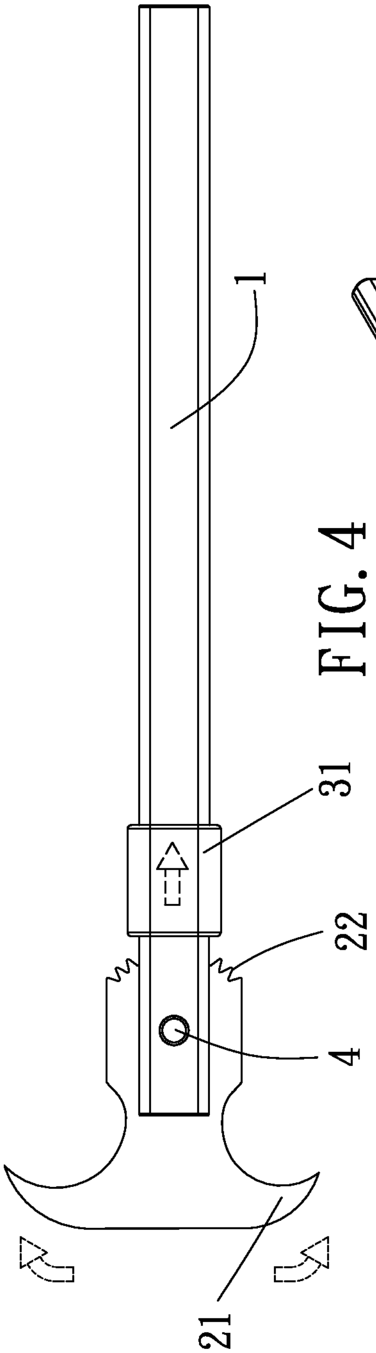
FIG. 4 is a view showing a pivoting of a hooking element of a preferred embodiment of the oil seal removing tool of the present invention.
Figure 4A:
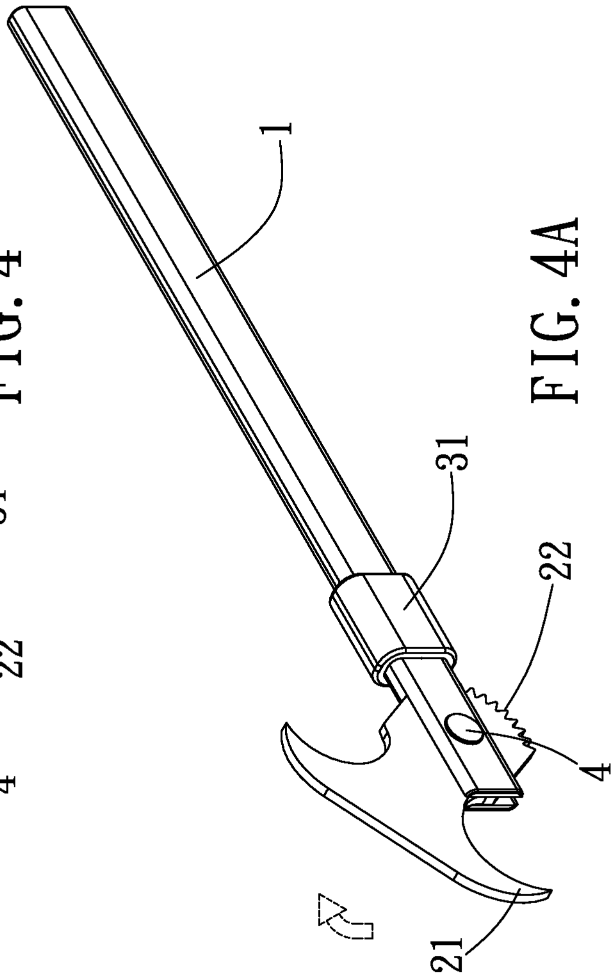
FIG. 4A and FIG. 4B is an action view showing a pivoting of a hooking element of a preferred embodiment of the oil seal removing tool of the present invention.
Figure 4B:
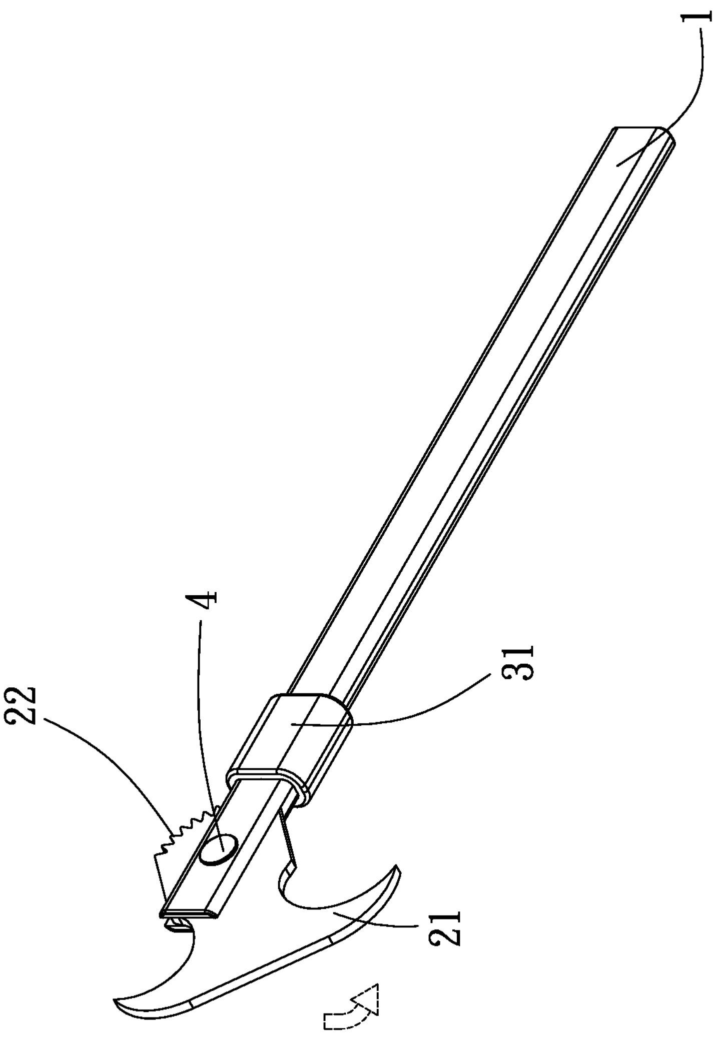
Figure 5:
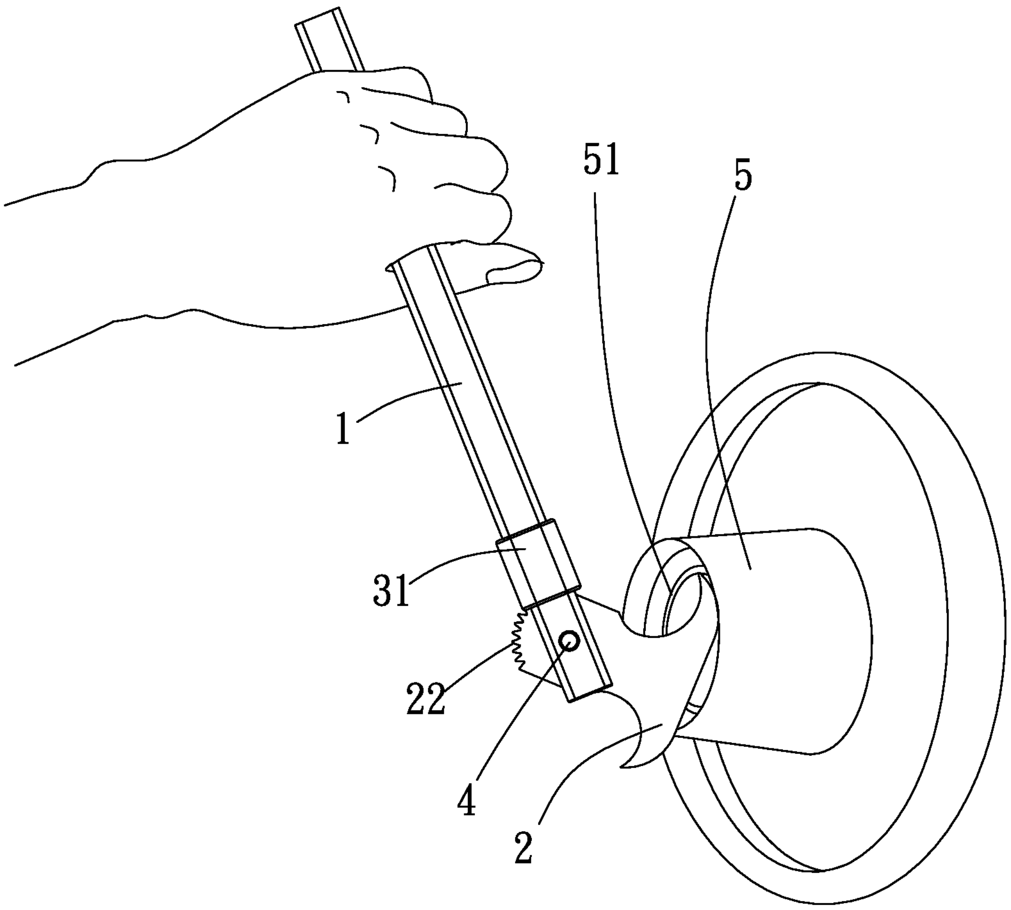
FIG. 5 is a view showing a usage situation of a preferred embodiment of the oil seal removing tool of the present invention.

Before using the oil seal removing tool of the present invention to remove an oil seal, first of all, move the sliding sleeve 31 from the first position to the second position. Please refer to FIG. 3 and FIG. 3A, the engagement between the toothed element 32 and the location end 22 is separated. In that, the hooking element 2 is able to pivot freely from the engaging end 11, as shown in FIG. 4. And then, please refer to FIG. 4A and FIG. 4B, pivot the hooking element 2 to a preferred angle, and move the sliding sleeve 31 from the second position back to the first position. Such that, the toothed element 32 is engaged to the toothed portion of the location end 22. The elastic force of the elastic element 33 can push the toothed element 32 and fix the hooking element 2 at the preferred position. After that, please refer to FIG. 5, hook an oil seal 51 at an opening 5 of a tube by one of the hooking portions 21,21', and draw the oil seal 51 out of the opening 5 of the tube.

Since the oil seal removing tool of the present invention has two hooking portions which have different hooking angles, a user can choose one of the hooking portions to use in demand. More importantly, the location portion can slide at the engaging end, and the elastic element can provide continuous fixation. More specifically, when the location portion is at the first position or at the second position, the hooking element is fixed or is released respectively. Sliding the sliding sleeve to compress the elastic element is also easier than conventional way. Also, when the sliding sleeve is released, the hooking element is fixed by the elastic element immediately, instead of the time-consumed conventional way by screwing. Moreover, the conventional way by screwing is difficult to operate in two hands, so the efficiency is reduced. In the present invention, a user can hold the hooking element in one hand, and control the sliding sleeve in another hand. The operation is much easier and more efficient. Also, the hooking element can pivot at a maximum angle in the groove between the two boards.

What is claimed is:

1. An oil seal removing tool, comprising:

a hand piece, having an engaging end and a holding end, a sliding slot being formed at the engaging end;

a hooking element, having at least one hooking portion and a location end, a toothed portion being formed at the location end, the hooking element being disposed on the engaging end pivotably;

a location portion, being disposed on the engaging end, the location portion including a sliding sleeve and an elastic element, a position of the sliding sleeve corresponding to a position of the sliding slot, the sliding sleeve is slidable between a first position and a second position, the location portion being pressed against the toothed portion due to an elastic force of the elastic element when the sliding sleeve is at the first position, the location portion being separated from the toothed portion when the sliding sleeve is at the second position.

2. The oil seal removing tool of claim 1, wherein the hand piece includes a blocker which is disposed on the engaging end, an end of the elastic element being pressed against the blocker.

3. The oil seal removing tool of claim 2, wherein the oil seal removing tool also includes an engaging element, two corresponding boards extend from the engaging end, the hooking element has a pivot hole, each board has an aperture, each aperture corresponds to the pivot hole, the engaging element is arranged in the pivot hole and the two apertures.

4. The oil seal removing tool of claim 3, wherein the location portion has a toothed element, when the sliding sleeve is at the first position, an end of the toothed element is engaging to the toothed portion, the other end of the toothed element pressed against to the elastic element.

5. The oil seal removing tool of claim 4, wherein a longitudinal slot is formed on the sliding sleeve, the location portion includes a fixing element, a fixing hole is formed on the toothed element, the fixing element is arranged in the longitudinal slot and the fixing hole.

6. The oil seal removing tool of claim 1, wherein two corresponding boards extend from the engaging end, a groove is formed between the two boards, the hooking element is disposed on the groove, in that, the hooking element is able to pivot at a maximum angle.

7. The oil seal removing tool of claim 6, wherein the oil seal removing tool also includes an engaging element, the hooking element has a pivot hole, each board has an aperture, each aperture corresponds to the pivot hole, the engaging element is arranged in the pivot hole and the two apertures.

8. The oil seal removing tool of claim 7, wherein the location portion has a toothed element, when the sliding sleeve is at the first position, an end of the toothed element is engaging to the toothed portion, the other end of the toothed element pressed against to the elastic element.

9. The oil seal removing tool of claim 8, wherein a longitudinal slot is formed on the sliding sleeve, the location portion includes a fixing element, a fixing hole is formed on the toothed element, the fixing element is arranged in the longitudinal slot and the fixing hole.

10. The oil seal removing tool of claim 1, the toothed portion being arc-shaped.

* * * * *